(12) United States Patent
Hoffman et al.

(10) Patent No.: US 10,980,179 B2
(45) Date of Patent: Apr. 20, 2021

(54) DRAPER BELT

(71) Applicant: Deere and Company, Moline, IL (US)

(72) Inventors: Daniel S. Hoffman, Bettendorf, IA (US); Anthony M. Hasenour, Port Byron, IL (US)

(73) Assignee: Deere & Company, Moline, IL (US)

( * ) Notice: Subject to any disclaimer, the term of this patent is extended or adjusted under 35 U.S.C. 154(b) by 192 days.

(21) Appl. No.: 15/796,817

(22) Filed: Oct. 29, 2017

(65) Prior Publication Data

US 2018/0271018 A1 Sep. 27, 2018
US 2020/0344952 A9 Nov. 5, 2020

Related U.S. Application Data

(63) Continuation-in-part of application No. 15/494,482, filed on Apr. 22, 2017, now Pat. No. 10,206,332.

(51) Int. Cl.
| | |
|---|---|
| *A01D 61/00* | (2006.01) |
| *A01D 61/02* | (2006.01) |
| *B65G 15/30* | (2006.01) |
| *B65G 15/42* | (2006.01) |
| *B65G 15/46* | (2006.01) |
| *A01D 57/20* | (2006.01) |

(52) U.S. Cl.
CPC ........... *A01D 61/002* (2013.01); *A01D 61/02* (2013.01); *B65G 15/30* (2013.01); *B65G 15/42* (2013.01); *B65G 15/46* (2013.01); *A01D 57/20* (2013.01)

(58) Field of Classification Search
CPC ........ B65G 15/30; B65G 15/42; B65G 15/46; B65G 15/64; B65G 23/06; B65G 39/071; A01D 61/002; A01D 61/02; A01D 57/20; A01D 45/023; A01D 89/003; A01F 15/18; A01F 2015/18; A01F 2015/186; A01F 2015/077; A01F 2015/078
See application file for complete search history.

(56) References Cited

U.S. PATENT DOCUMENTS

| | | | | |
|---|---|---|---|---|
| 207,626 | A * | 9/1878 | Sargent | F16H 55/36 474/167 |
| 3,980,174 | A * | 9/1976 | Conrad | B65G 15/46 198/835 |
| 4,008,801 | A * | 2/1977 | Reilly | B65G 15/46 198/841 |
| 4,011,939 | A | 3/1977 | Conrad | |
| 4,072,062 | A * | 2/1978 | Morling | A01D 45/023 198/494 |

(Continued)

FOREIGN PATENT DOCUMENTS

| | | | | |
|---|---|---|---|---|
| EP | 2345321 | | 7/2011 | |
| GB | 1545063 | | 5/1979 | |
| JP | 62021605 | A * | 1/1987 | ............. B65G 15/48 |

OTHER PUBLICATIONS

EP Search Report for 18202558.5-1006 dated Mar. 18, 2019.

*Primary Examiner* — Arpad Fabian-Kovacs
(74) *Attorney, Agent, or Firm* — Rathe Lindenbaum LLP (57) ABSTRACT

A draper belt for a head of a harvester that is to extend about a roller having an outer groove encircling the roller and may include a web and an elastomeric belt guide. The web may have a first surface to carry crop material and a second surface to face the roller. The elastomeric belt guide may extend from the second surface and may include downwardly projecting teeth.

20 Claims, 6 Drawing Sheets

(56) References Cited

U.S. PATENT DOCUMENTS

| | | | | |
|---|---|---|---|---|
| 4,127,040 A * | 11/1978 | Moore | ............... | B29D 29/00 |
| | | | | 474/167 |
| 4,225,036 A * | 9/1980 | Michael | ............... | B65G 15/46 |
| | | | | 198/840 |
| 4,449,958 A * | 5/1984 | Conrad | ............... | B65G 15/42 |
| | | | | 198/834 |
| 4,601,685 A * | 7/1986 | Delhaes | ............... | B65G 15/46 |
| | | | | 198/840 |
| 4,634,409 A * | 1/1987 | Johnson | ............... | F16G 1/28 |
| | | | | 474/152 |
| 4,724,909 A * | 2/1988 | Link | ............... | A01D 17/10 |
| | | | | 171/126 |
| 4,805,388 A | 2/1989 | Kell | | |
| 5,017,969 A * | 5/1991 | Mitomi | ............... | G03G 15/0131 |
| | | | | 198/835 |
| 5,320,589 A * | 6/1994 | Singleton | ............... | A63B 22/02 |
| | | | | 482/54 |
| 5,484,321 A * | 1/1996 | Ishimoto | ............... | A63H 17/14 |
| | | | | 305/165 |
| 5,768,986 A * | 6/1998 | Arnold | ............... | A01F 15/18 |
| | | | | 100/88 |
| 5,822,959 A * | 10/1998 | Norton | ............... | A01D 41/10 |
| | | | | 56/1 |
| 5,911,307 A * | 6/1999 | Kraft | ............... | B65G 15/64 |
| | | | | 198/846 |
| 6,109,427 A * | 8/2000 | Hosch | ............... | B65G 23/44 |
| | | | | 198/835 |
| 6,564,932 B2 * | 5/2003 | Itoh | ............... | B65G 15/64 |
| | | | | 198/834 |
| 7,021,457 B1 * | 4/2006 | Schiltz | ............... | B65G 15/64 |
| | | | | 198/835 |
| 7,124,879 B1 * | 10/2006 | Maguire | ............... | B65G 15/42 |
| | | | | 198/690.2 |
| 7,640,720 B1 * | 1/2010 | Lovett | ............... | A01D 57/20 |
| | | | | 56/181 |
| 7,661,667 B2 * | 2/2010 | Tsutsui | ............... | B65H 5/026 |
| | | | | 198/834 |
| 7,802,417 B2 * | 9/2010 | Sauerwein | ............... | A01D 41/14 |
| | | | | 56/181 |
| 7,850,562 B2 * | 12/2010 | DeGroot | ............... | B65G 15/26 |
| | | | | 474/153 |
| 7,862,879 B2 * | 1/2011 | Levine | ............... | D21F 1/0027 |
| | | | | 428/172 |
| 8,272,199 B2 * | 9/2012 | Sauerwein | ............... | A01D 57/20 |
| | | | | 56/181 |
| 8,281,561 B2 * | 10/2012 | Dow | ............... | A01D 57/20 |
| | | | | 56/181 |
| 8,291,686 B1 * | 10/2012 | Cormier | ............... | A01D 61/002 |
| | | | | 56/181 |
| 8,464,862 B2 * | 6/2013 | Honeycutt | ............... | B65G 15/42 |
| | | | | 198/822 |
| 8,579,774 B2 * | 11/2013 | Derscheid | ............... | A01F 15/18 |
| | | | | 198/835 |
| 9,365,350 B2 * | 6/2016 | Sherwood | ............... | B65G 21/22 |
| 9,434,546 B2 * | 9/2016 | Cornelissen | ............ | B65G 17/086 |
| 9,643,788 B2 * | 5/2017 | Steinert | ............... | B65G 39/20 |
| 9,901,035 B2 * | 2/2018 | Ryz | ............... | A01F 15/18 |
| 2002/0175055 A1 * | 11/2002 | Ryde | ............... | B65G 15/34 |
| | | | | 198/847 |
| 2004/0089519 A1 * | 5/2004 | Pollak | ............... | B65G 15/64 |
| | | | | 198/834 |
| 2005/0022491 A1 * | 2/2005 | Zurn | ............... | A01D 57/20 |
| | | | | 56/16.4 R |
| 2005/0082147 A1 * | 4/2005 | Mol | ............... | B65G 15/42 |
| | | | | 198/834 |
| 2011/0315524 A1 * | 12/2011 | Kidd | ............... | A01D 15/18 |
| | | | | 56/341 |
| 2015/0075130 A1 * | 3/2015 | Ryz | ............... | A01F 15/18 |
| | | | | 56/341 |

* cited by examiner

DRAPER BELT

REFERENCE TO RELATED APPLICATION

The present application is a continuation-in-part of co-pending U.S. patent application Ser. No. 15/494,482 filed on Apr. 22, 2017 by Anthony M. Hasenour and entitled DRAPER BELT GUIDE, the full disclosure of which is hereby incorporated by reference.

BACKGROUND

Draper belts are used on harvester heads to convey severed crop material transversely across the head to a feeder housing that further conveys the crop material into the harvester for handling, such as threshing and cleaning. During operation, the draper belts may become misaligned, potentially damaging the belt or other components of the harvester head.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

In an attempt to maintain alignment of the draper belts with their supporting rollers and other structures on the harvester head, some draper belts include a V-shaped guide that extends in a corresponding V-shaped groove of a drive roller and that extends within a corresponding V-shaped groove of an idler roller. However, such V-shaped guides are still susceptible to dislodgment from the V-shaped grooves and misalignment of the belt when encountering loading. During harvesting operations, grain, straw, chaff and soil may be trapped in the V-shaped grooves of the drive roller and the idler roller. Such foreign material within the groove may reduce the effectiveness of the V-shaped guide and may increase the likelihood of the V-shaped guide becoming dislodged and the draper belt becoming misaligned with the drive and idler rollers.

Disclosed herein are various examples of a draper belt and a harvester head that may better maintain alignment of the draper belt with respect to its supporting rollers and other components of the harvester head by removing or cleaning grain, straw, chaff or soil from within the grooves of the drive roller and the idler roller. Disclosed herein are various examples of a draper belt having an elastomeric belt guide that is received within the grooves of the rollers, wherein the belt guide includes downwardly or inwardly projecting spaced teeth that extend into the groove of the rollers. Spaces between the teeth are sized so as to receive the trapped grain, straw, chaff and soil while the teeth push the received grain, straw, chaff or soil out of the groove. In some implementations, the teeth and/or web supporting the belt guide in teeth are sufficiently flexible such that tips of the teeth pinch towards one another as a draper belt wraps about the roller. The pinched teeth pinch the received grain, straw, chaff, or soil as the grain, straw, chaff or soil is carried about the roller. Upon moving away from the roller and upon exiting the groove, the previously pinched teeth return to a more flat state, releasing the grain, straw, chaff or soil.

Disclosed herein is an example a draper belt for a head of a harvester. The draper belt is to extend about a roller having an outer groove encircling the roller. The draper belt may include a web having a first surface to carry crop material and a second surface to face the roller and an elastomeric belt guide projecting from the second surface. The belt guide may include downwardly projecting teeth.

Disclosed herein is an example harvester that may comprise a first roller having first outer groove, a second roller having a second outer groove, and a draper belt extending about the first roller and the second roller. The draper belt may comprise a web having a first surface to carry crop material and a second surface to face the roller and an elastomeric belt guide projecting from the second surface. The belt guide may comprise downwardly projecting teeth.

Disclosed herein is an example method that may include guiding movement of a draper belt about spaced rollers with an elastomeric belt guide projecting from the draper belt into grooves in the spaced rollers and cleaning the grooves with teeth of the elastomeric belt guide.

Figure 1:
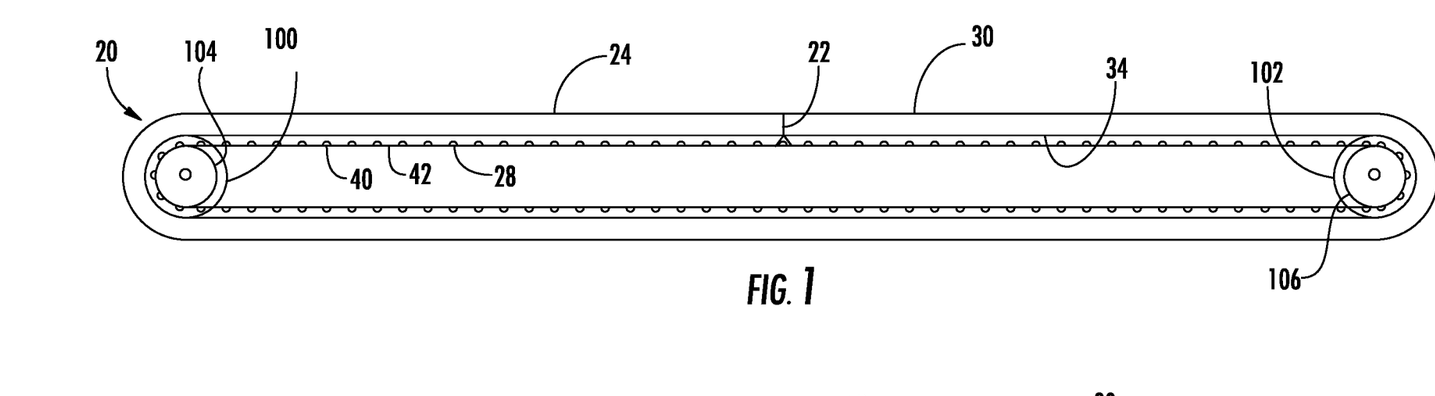
FIG. 1 is a sectional view of an example draper belt of a harvester head while being supported by a pair of rollers.

FIG. 1 is a sectional view of an example draper belt 20 of a harvester head, illustrated as being supported by rollers 100, 102 having grooves 104, 106, respectively. As shown by FIG. 1, belt 20 is configured to continuously wrap about a pair of opposite rollers, such as the example rollers 100, 102. For purposes of this disclosure, the phrase "configured to" denotes an actual state of configuration that fundamentally ties the stated function/use to the physical characteristics of the feature proceeding the phrase "configured to". Rollers 100, 102 comprise outer grooves 104, 106, respectively. In one implementation, belt 20 is continuous and lacks a seam or seams. In another implementation, belt 20 may comprise a seamed belt having at least one seam 22 at which end portions of belt 20 are joined to one another or retained relative to one another.

Belt 20 comprises web 24 and belt guide 28. Web 24 comprises an expanse of flexible, in one implementation, elastomeric, material having an upper outer surface 30 to carry crop material and a second opposite inner surface 34 which face rollers 100, 102 or one another. Although not illustrated, in some implementations, outer surface 30 may include additional structures, such as cleats, to facilitate conveyance of crop material. In such an implementation, such cleats may extend substantially perpendicular to guide 28 at spaced locations along surface 24.

Belt guide 28 comprises an elongate rib, bar or other protuberance projecting from surface 34 in a direction away from surface 30. Belt guide 28 is sized, shaped and located so as to be received within both of grooves 104, 106 of rollers 100, 102 when belt 20 is positioned on in about such rollers 100, 102. Belt guide 28 tracks grooves 104, 106 to maintain the positioning and alignment of belt 20 in a harvester head.

As further shown by FIG. 1, belt guide 28 comprises a series of downwardly or inwardly projecting and spaced apart teeth 40. In one implementation, teeth 40 project along an underside of belt guide 28. In one implementation, teeth 40 are formed by notches formed in the underside of belt guide 28. Teeth 40 are separated by gaps 42 that receive any dirt, grain, chaff or straw (hereinafter referred to as contaminants) that may have become lodged or trapped within grooves 104, 106. As belt guide 20 driven about rollers 100, 102, teeth 40 push and carry the contaminants within gaps 42 about rollers 100, 102 until the contaminants are expelled out of grooves 104, 106. In some implementations, the tips of the teeth 40 are deformed towards one another so as to converge or pinched together, trapping the contaminants within gaps 42 as draper belt 20 driven about rollers 100, 102. As a result, grooves 104, 106 are substantially cleared of contaminants which might otherwise dislodge belt guide 28 from grooves 104, 106.

Figure 2:
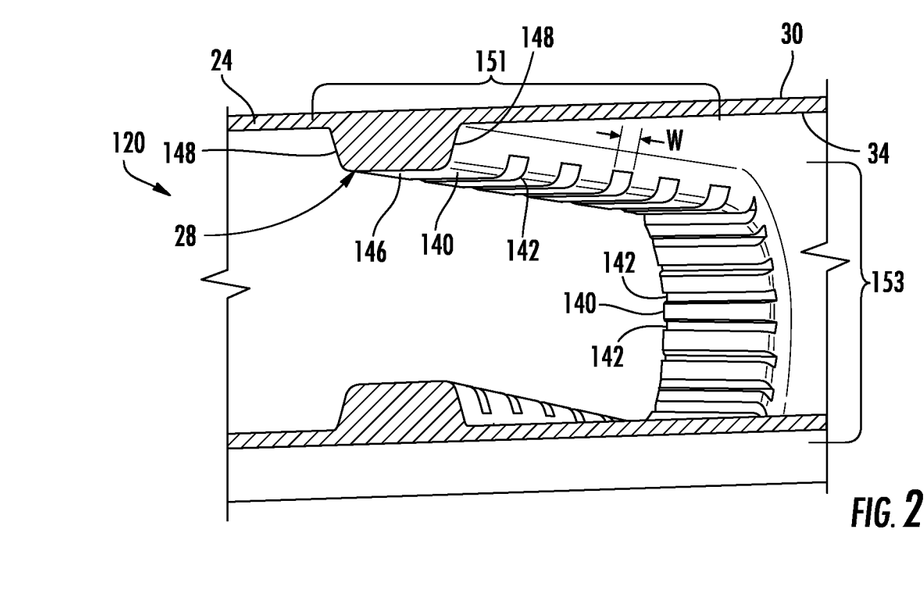
FIG. 2 is an enlarged sectional view of a portion of another example draper belt, illustrating the draper belt as it is being wrapped about a roller (the roller being omitted).

FIG. 2 is a sectional view of a portion of draper belt 120, an example of draper belt 20 that may utilize with rollers 100, 102. FIG. 2 illustrates draper belt 120 in its operational shape as it wraps about a roller 100, 102 (not shown in FIG. 2). Draper belt 120 is similar to draper belt 20 described above except the draper belt 120 is specifically illustrated as comprising teeth 140 separated by gaps 142. Those remaining components of draper belt 120 which correspond to components of draper belt 20 are numbered similarly.

Gaps 142 comprise notches in the underside of belt guide 28 and form teeth 140. Teeth 140 each have a substantially flat tip 146 and outwardly extending sides 148. As shown by FIG. 2, those portions of draper belt 120 not wrapping about a roller are in a nondeformed state (portion 151 of draper belt 120 as shown). Those portions of draper belt 120 have larger gaps 142 between consecutive teeth 140. In the example illustrated, those portions of draper 120 which are not deformed, which are spanning between rollers 100, 102, have gaps 142 with a width W of at least 3 mm in a height or depth of at least 3 mm. The size of such gaps 142 facilitates the reception of larger sized and un-compressible contaminants such as grain, such as peas or soybeans. Those portions of draper belt 120 wrapping about rollers 100, 102 are in a deformed state which reduces the size of the gaps 142 between consecutive teeth 140. The inner radial face of draper belt 120, when wrapping about a roller 102, 104 is in a state of compression which results in teeth 140 being pinched towards one another as shown in portion 153 of draper belt 120. In one implementation, each gap 142 closes by approximately 2 mm from 8 mm to 6 mm, 25 to 40% of the original gap size. In another implementation, each gap 142 closes from an nondeformed or flat state having a width of 6 mm to a deformed state having a width of 4 mm. In yet another implementation, each gap 142 closes from an non-deformed or flat state having with the 5 mm to a deformed state having a width of 3 mm. The various examples, the width of gap 142 may close by at least 10% and up to 50% when going from a flat state to a curved, deformed state. The reduction in the size of gap 142 as draper belt 120 wraps about the roller 100, 102 results in the contaminants being pinched as the contaminants are carried away from the grooves 104, 106 of rollers 100, 102, respectively (shown in FIG. 1). In other implementations, the size of gaps 142 may be smaller, as small as 1 mm deep and 0.5 mm wide, depending upon the size of the contaminants desired to be cleaned from the grooves 104, 106.

Figure 3:
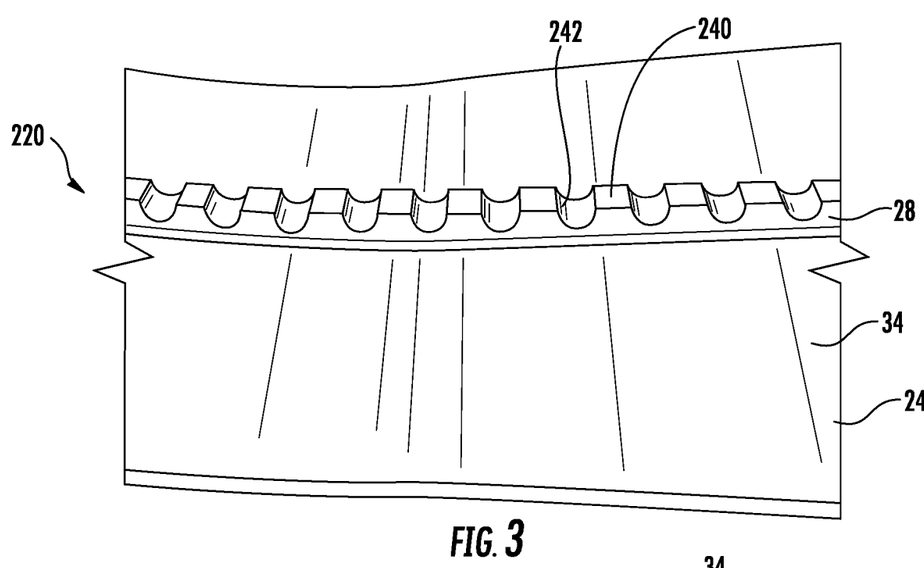
FIG. 3 is a perspective view of a portion of another example draper belt.
Figure 4:
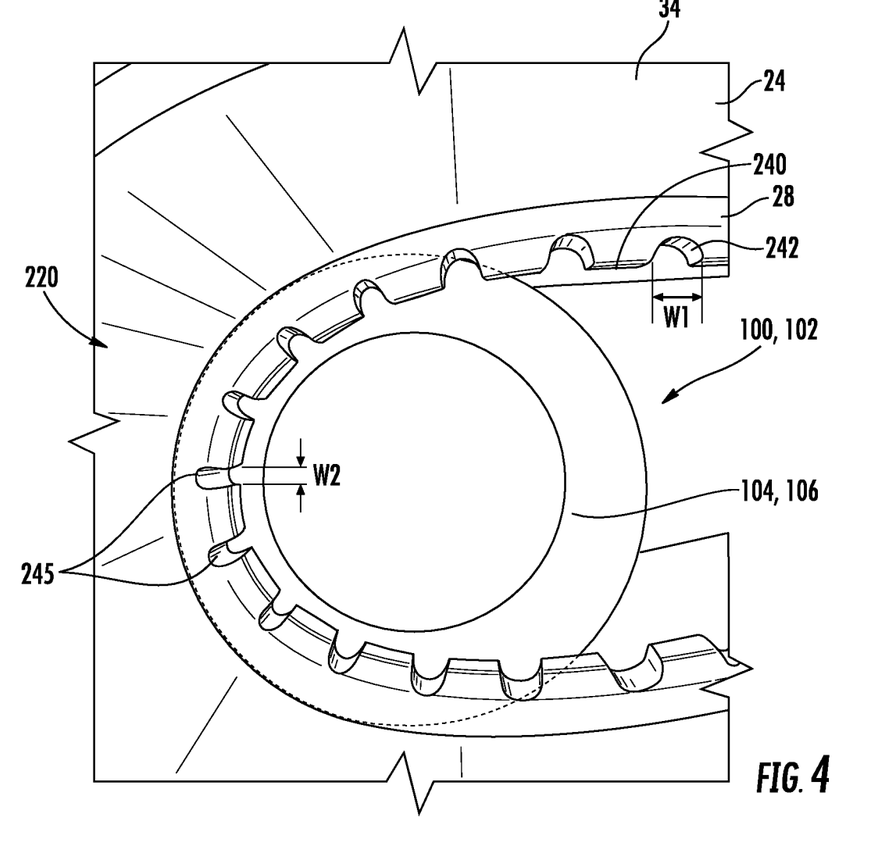
FIG. 4 is a side view of a portion of the example draper belt of FIG. 3 as it is winding about a roller shown in section.

FIGS. 3 and 4 illustrate portions of draper belt 220, another example of draper belt 20. FIG. 3 illustrates a bottom side or underside of draper belt 220 while in a flat, nondeformed state, such as when draper belt 220 spanning between rollers 100, 102. Although not illustrated, it should be appreciated that driven about 220 may comprise cleats on an opposite face, similar to those shown in FIG. 7. FIG. 4 illustrates draper belt 220 as it is wrapping about one of rollers 100, 102. Draper belt 220 is similar to draper belt 20 except the draper belt 220 is specifically illustrated as comprising teeth 240 separated by gaps 242. Those remaining components of draper belt 220 which correspond to components of draper belt 20 are numbered similarly.

Teeth 240 and gaps 242 of belt guide 28 continuously extend along the entire length of draper belt 220 on the underside 34 of web 24. Each of gaps 242 has a cylindrical cross-sectional shape, having a rounded or curved floor extending between consecutive teeth 240. In the example illustrated, teeth 240 each have the same size, shape and spacing along the length of draper belt 220. Likewise, each of gaps 242 has same size, shape and spacing when in a nondeformed state, the portion of the draper belt 220 extending between rollers 100, 102.

In the example illustrated, each of gaps 242 has a width W1 in those portions of belt 220 in a non-deformed state. In one implementation, width W1 is 8 millimeters. The material belt guide 28 and web 24 is sufficiently flexible such that each of gaps 242 has a width W2, when most compressed, of 6 millimeters, a reduction of 25 percent of the original gap size. As a result, a contaminant 245 may become pinched within the reduced size gap 242.

Belt guide 28 and teeth 240 are formed from a material and/or are dimensioned so as to facilitate the pinching of teeth 240 when wrapping about roller 100, 102. In the example illustrated, belt guide 28 and teeth 240 are formed from elastomeric material such as SBR rubber. In one implementation, belt guide 28 is formed from a material having a durometer thereof between 50 and 85 Shore A. in other implementations, belt guide 28 teeth 240 may be formed from other materials having sufficient flexibility to pinch about and hold contaminants.

Figure 5:
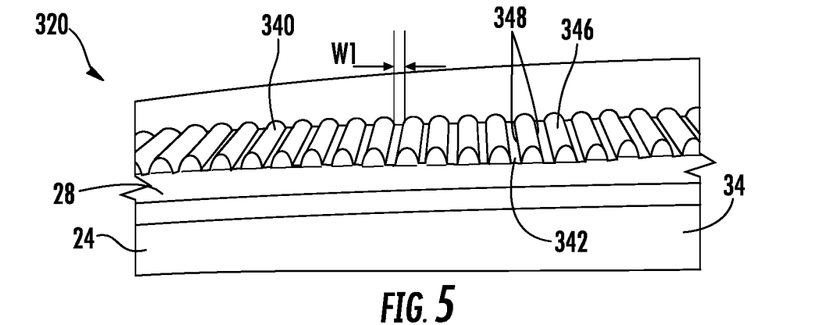
FIG. 5 is a perspective view of a portion of another example draper belt.
Figure 6:
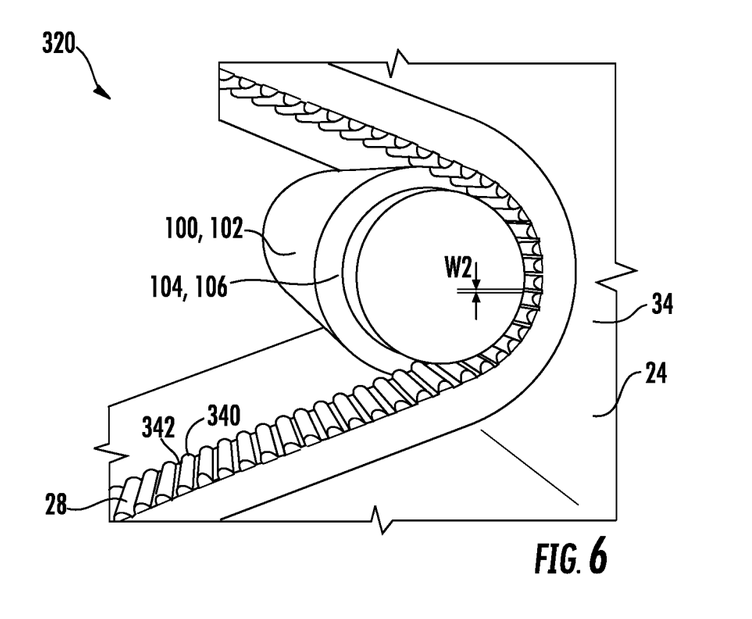
FIG. 6 is a perspective view of a portion of the example draper belt of 5 as it is winding about a roller shown in section.

FIGS. 5 and 6 illustrate portions of draper belt 320, another example of draper belt 20. FIG. 5 illustrates a bottom side or underside of draper belt 320 while in a flat, nondeformed state, such as when draper belt 320 spanning between rollers 100, 102. Although not illustrated, it should be appreciated that draper belt 320 may comprise cleats on an opposite face, similar to those shown in FIG. 7. FIG. 6 illustrates draper belt 320 as it is wrapping about one of rollers 100, 102. Draper belt 320 is similar to draper belt 20 except the draper belt 320 is specifically illustrated as comprising teeth 340 separated by gaps 342. Those remaining components of draper belt 320 which correspond to components of draper belt 20 are numbered similarly.

Teeth 340 and gaps 342 of belt guide 28 continuously extend along the entire length of draper belt 320 on the underside 34 of web 24. In the example illustrated, teeth 340 each of the same size, shape and spacing along the length of draper belt 320. Likewise, each of gaps 342 has the same size, shape and spacing when in a nondeformed state, the portion of the draper belt 320 extending between rollers 100, 102.

As shown by FIG. 5, teeth 340 each have a rounded or curved tip 346 and outwardly angled sides 348. The floor of each of gaps 342 is-rounded. In the example illustrated, each of teeth 340 has a semi-oval or semicircular cross-sectional shape. The curved surface of each of teeth 340 prevent compaction of contaminants in the grooves 104, 106.

In the example illustrated, each of gaps 342 has a width W1 in those portions of belt 320 in a non-deformed state. In one implementation, width W1 is 5 millimeters. The material of belt guide 28 and web 24 is sufficiently flexible such that each of gaps 342 has a width W2, when most compressed, of 3 millimeters, a reduction of 40 percent of the original gap size. As a result, a contaminant may become pinched within the reduced size gap 342.

Belt guide 28 and teeth 340 are formed from a material and/or are dimensioned so as to facilitate the pinching of teeth 340 when wrapping about roller 100, 102. In the example illustrated, belt guide 28 and teeth 340 are formed from elastomeric material such as SBR rubber. In one implementation, belt guide 28 is formed from a material having a durometer of between 50 and 85 Shore A. In other implementations, belt guide 28 and teeth 340 may be formed from other materials having sufficient flexibility to pinch about and hold contaminants.

Figure 7:
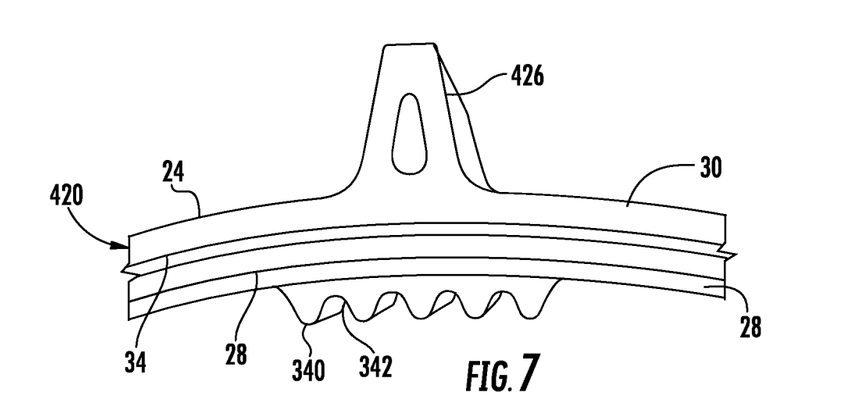
FIG. 7 is a perspective view of the portion of another example draper belt.

FIG. 7 is a bottom perspective view of an example draper belt 420. Draper belt 420 is similar to draper belt 320 except that draper belt 420 comprises cleats 426 and that teeth 340 and their intervening spaces 342 are arranged in groups or clusters centered about each respective cleat 426. Those remaining components of draper belt 420 which correspond to components of draper belt 20 or draper belt 320 are numbered similarly.

Cleat 426 comprises a wall or protuberance projecting from face 30 of web 24. Cleat 426 has a height so as to engage crop material and carry crop material as draper belt 420 driven about rollers 100, 102 (shown in FIG. 1). In other implementations, cleat 426 may have other shapes or may be omitted.

Teeth 340 and 342 are described above. However, in draper belt 420, teeth 340 and the intermediate gaps 342 between adjacent teeth 340 are grouped or arranged in spaced clusters along belt guide 28 along length of draper belt 420. In the example illustrated, each of teeth 340 are located opposite to a respective cleat 426 such that the different groups or clusters of teeth 340 are uniformly spaced along draper belt 420. Locating teeth 340 opposite of cleats 426 facilitates less complex fabrication of draper belt 420. The discontinuous nature of teeth 340 further reduces material costs.

In other implementations, teeth 340 may be nonuniformly spaced along the draper belt 420. In other implementations, teeth 340 may be provided other locations other than opposite to cleats 426. Although teeth 340 are illustrated as being arranged in a group of five consecutive teeth, in other implementations, such groupings may have a larger or fewer number of such teeth 340. In other implementations, teeth 340 may have other shapes. For example, teeth 340 may alternatively have a shape similar to that of teeth 140 or 240 described above.

Figure 8:
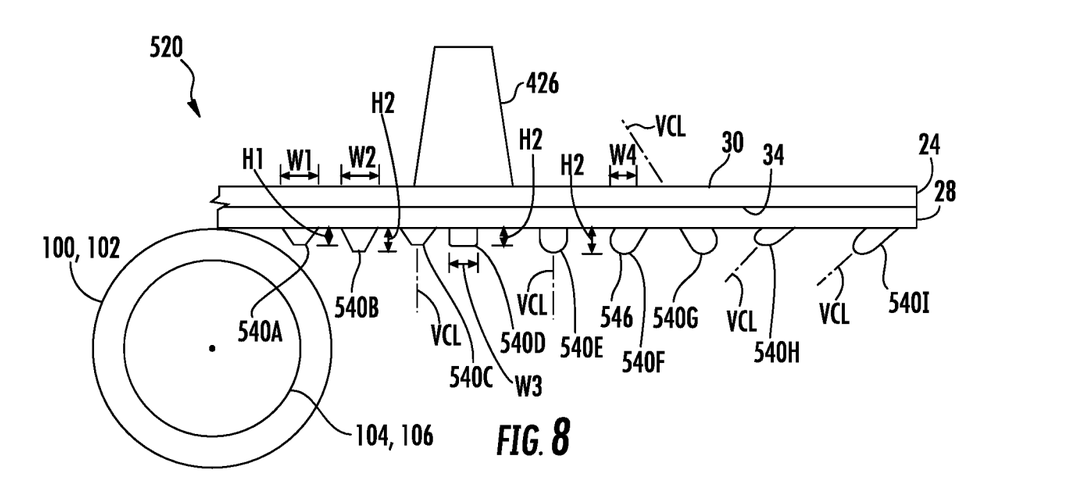
FIG. 8 is a sectional view of a portion of another example draper belt taken along line 8-8 of FIG. 9.
Figure 9:
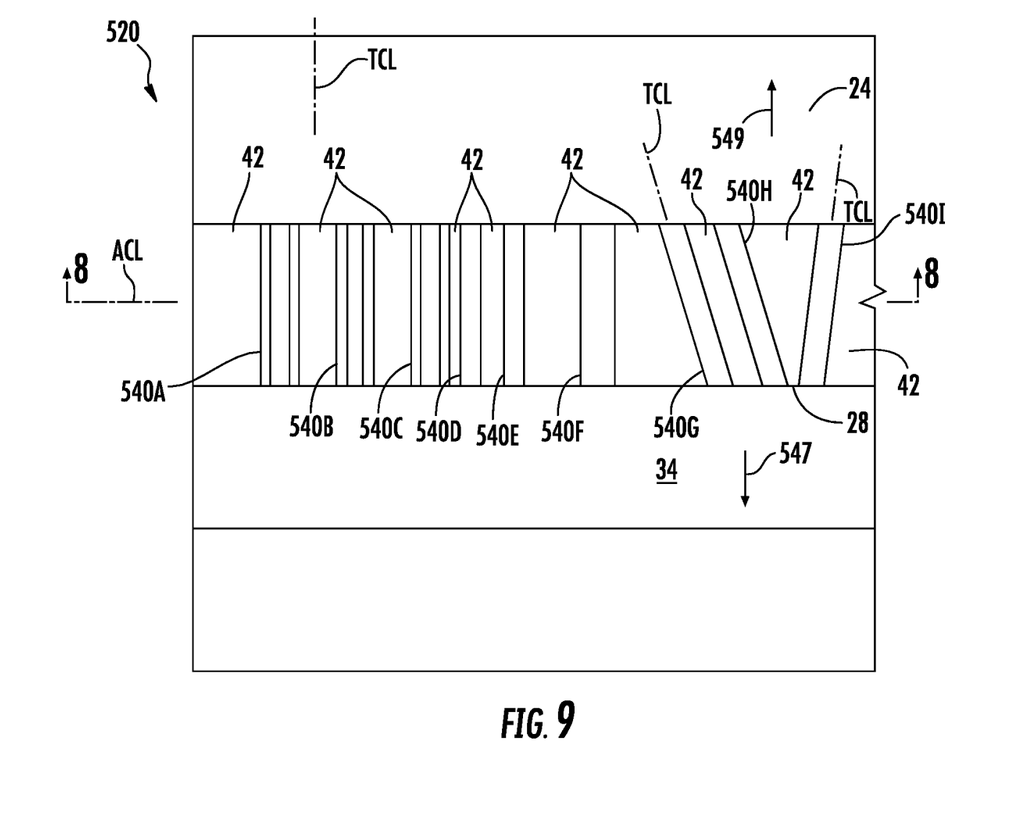
FIG. 9 is a bottom view of the portion of the example draper belt of FIG. 8.

FIGS. 8 and 9 illustrate portions of draper belt 520, another example implementation of draper belt 20. FIG. 8 is a sectional view of a portion of draper belt 520, taken along line 8-8 of FIG. 9, just prior to the illustrated portion wrapping about an example roller 100, 102. FIG. 9 is a bottom plan view of the portion of draper belt 520 shown in FIG. 8. FIGS. 8 and 9 illustrate teeth 540 while belt 520 is in a non-deformed state, those portions of draper belt 520 not wrapping about rollers 100, 102, but spanning between such rollers 100, 102.

Draper belt 520 is similar to draper belt 20 except that draper belt 520 comprises cleat 426 (described above) and teeth 540A, 540B, 540C, 540D, 540E, 540F, 540G and 540H (collectively referred to as teeth 540). Those remaining components of draper belt 520 which correspond to components of the above-described draper belts are numbered similarly. It should be appreciated that although FIGS. 8 and 9 illustrate a single belt guide 28 having teeth 540, draper belt 520 comprises two transversely spaced belt guides 28 corresponding to two transversely spaced grooves in each of rollers 100, 102, wherein each of the belt guides 28 have teeth 540. In other implementations, other draper belts may be provided with a single or more than two belt guides 28 having teeth 540, wherein rollers 100, 102 have a corresponding number of grooves.

As shown by FIG. 8, belt guide 28 of draper belt 520 may include teeth 540 that are different from one another in shape, size, orientation or spacing. By mixing different teeth 540 on a single belt guide 28, enhanced cleaning of grooves 104, 106 may be achieved. Different teeth may be customized to carry and pinch different types of contaminants. For example, some teeth may be better suited for cleaning grain. Other teeth may be better suited for cleaning stems. Yet other teeth may be better suited for clean dust and chaff.

FIGS. 8 and 9 illustrate various examples of different teeth 540 that may be utilized on a single belt guide 28 of a single draper belt 520. It should be appreciated that various embodiments of draper belt 520 may include various combinations of the different teeth 540 that are illustrated. For example, belt guide 28 may not necessarily include each of the different teeth 540 illustrated. One example belt guide 28 may include just teeth 540A and 540B. Another example guide may include just teeth 540F and 540G. Yet another example belt guide 28 may include teeth 540A, 540E and 540F. For purposes of illustration, FIG. 8 illustrates the various examples of different types of teeth that may be utilized on a single belt guide 28 in any one of a variety of different combinations and different patterns or orders.

In one implementation, teeth 540 continuously extend along the entire length of belt guide 28 and draper belt 520. In yet another implementation, teeth 540 may be grouped in clusters similar to the teeth 340 described above with respect to draper belt 420. In implementation, each cluster or group of teeth may include teeth having different sizes (width and/or height), shapes and/or orientations. In yet another implementation, each cluster may have teeth that are similar to one another in at least one of size, shape and/or orientation, wherein each cluster has different teeth types. For example, one cluster group of teeth may include teeth 540A, another cluster or group of teeth may include teeth 540G and a third cluster group of teeth may include teeth 540H.

In some implementations, different types of teeth may have associated different gaps. For example, sets of teeth 540A may have first sized gaps between such teeth while sets of teeth 540E may have second sized gaps, different than the first sized, between such teeth. As a result, the spacing between the teeth may take into account the different configuration of the teeth themselves to enhance groove cleaning performance.

The example teeth 540A, 540C are similar to one another in size, shape and orientation. Teeth 540A, 540C each have a height H1 and a width W1 and a trapezoidal shape. Teeth 540A and 540C each have a transverse center line TCL (shown in 9) that is perpendicular to the axial center line ACL of belt guide 28. Teeth 540A and 540C each have a vertical centerline VCL that is perpendicular with respect to the plane of faith 34 of web 24. Teeth 540B (one of which is shown) each have a height H2 and a width W2 (different than height H1 and W1, respectively), a trapezoidal shape and a perpendicular orientation respect to both the axial centerline ACL of belt guide 28 and faced 34 of web 24.

The example teeth 540C (one of which is shown) each have a height H2 and a width W3 (different than widths W1 and W2), a rectangular or square shape, and a perpendicular orientation with respect to the axial centerline of belt guide 28 and with respect to face 34 of web 24. Although teeth 540A-540D are illustrated as having polygonal shapes, either a trapezoid or square/rectangles, in other implementations, teeth 540 may have other polygonal shapes. For example, such teeth may alternatively be triangular, or may include greater than three sides projecting the remainder of belt guide 28.

Teeth 540E (one of which is shown) have a height H2, a width W3, a shape having a curved or rounded tip 586 and a perpendicular orientation with respect to the axial centerline of belt guide 28. Teeth 540F are similar to teeth 540E except that teeth 540F have an oblique orientation with respect to face 34 of web 24. In the example illustrated, teeth 540F lean or are angled towards the left, having a vertical centerline forming an acute angle with respect to face 34 on the left side of each of teeth 540F (as seen in FIG. 8). In implementations where draper belt 520 is driven to the left (as seen in FIG. 8) teeth 540F lean towards the direction which draper belt 520 is driven. In other implementations, teeth 540F may lean or be angled towards the right, such as away from the direction which draper belt 520 is driven.

Teeth 540G (one of which is shown) are similar to teeth 540E except that teeth 540G have an oblique orientation with respect to face 34 of web 24 and an oblique orientation with respect to the axial centerline of belt guide 28. In the example illustrated, teeth 540G have a vertical centerline VCL is oblique to face 34 such that teeth 540G lean to the right (as seen in FIG. 8). In implementations where draper belt 520 driven to the left, teeth 540G lean away from the direction which draper belt 520 is driven. Teeth 540G are further oblique relative to the axial centerline ACL of belt guide 28. Teeth 540G each have a transverse center line TCL that is oblique to the axial centerline ACL of belt guide 28, being angled to the left as seen in FIG. 9).

Teeth 540H are similar to teeth 540G except that teeth 540H each have a vertical centerline VCL that is oblique to face 34 such that teeth 540H lean to the left. In implementations where draper belt 520 driven to the left, teeth 540H lean towards the direction in which driven about 520 is driven.

Teeth 540I (one of which is shown) are similar to teeth 540H except that teeth 540I each have a transverse center line TCL that is oblique to the axial centerline ACL of belt guide 28, being angled to the right as seen in FIG. 9). The oblique orientation or angling of teeth 540G, 540H and 540I with respect to the axial centerline of belt guide 28 may assist in controlling the direction in which contaminants are expelled when the teeth carrying the contaminants move away from roller 100, 102. For example, teeth 540G and 540H may expel contaminants in the direction indicated by arrow 547 whereas teeth 540I may expel contaminants in the direction indicated by arrow 549.

Although teeth 540I are illustrated as being further oblique relative to face 34, having a vertical centerline that leans to the left (as seen in FIG. 8), in other implementations, teeth 540I may alternatively have vertical centerlines that are perpendicular to face 34 (similar to that of teeth 540E). Likewise, although teeth 540G and 540H are illustrated as being oblique relative to face 34, in other implementations, such teeth may have vertical centerlines that are perpendicular to face 34 while still being oblique with respect to axial centerline of belt guide 28.

FIGS. 10-13 illustrate an example harvester head or header 700 as part of a harvester 701. The example header 700 generally comprises frame 702, cutter assembly 705, gathering reels 704, drapers or draper belts 706L, 706R (collectively referred to as draper belts 706), central draper belt 707 and feed drum 708. Frame 702 forms the exterior of header 700 and supports remaining components of header 700. Frame 702 is configured to be releasably mounted to a combine harvester 701.

Figure 10:
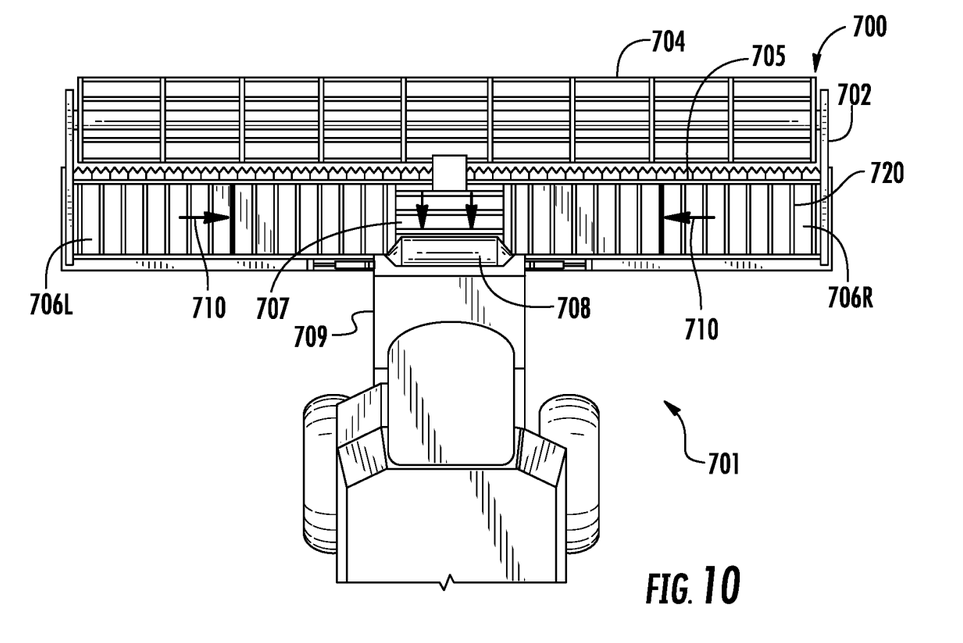
FIG. 10 is a top view of an example harvester having a harvester head with two example draper belts, each of the draper belts corresponding to the draper belt shown in FIGS. 8 and 9.

Gathering reels 704 gather and direct the crop towards cutter assembly 705. Cutter assembly 705 cuts and are severs the crop or plant from soil. Draper belts 706 comprise carpets, platforms or belts which are transversely driven so as to carry the severed plants or crops to central draper 707. Draper belt 706R carries the severed crops in the direction indicated by arrow 710 or draper belt 706L carries the severed crops in the direction indicated by arrow 711. Central draper belt 707 conveys the severed crop material to feed drum 708. Feed drum 708 is rotatably driven so as to move the severed crop material rearwardly into a feeder house 709 of harvester 701 for threshing.

Figure 11:
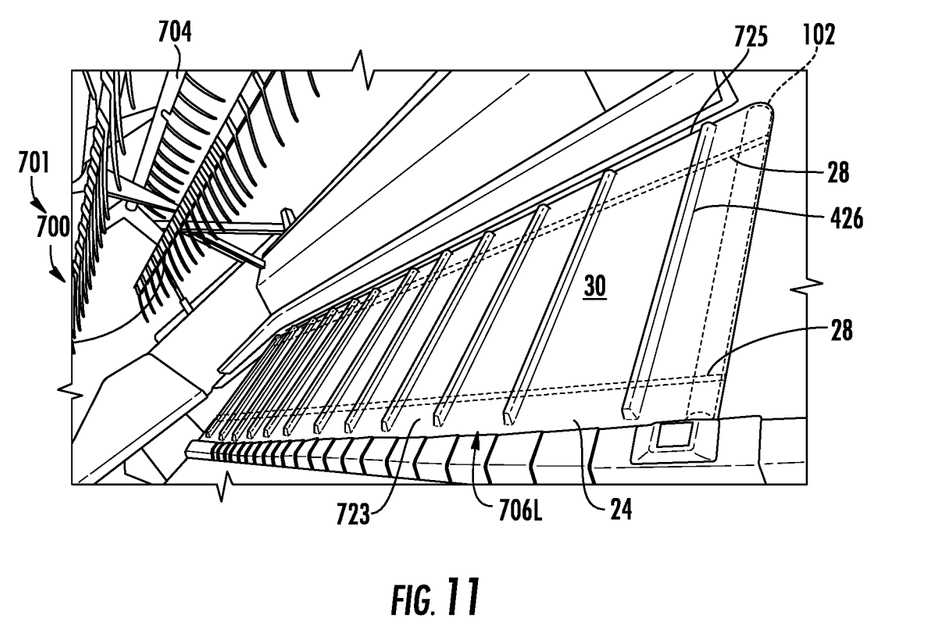
FIG. 11 is an enlarged fragmentary perspective view of the harvester head of FIG. 10, illustrating one of the draper belts.
Figure 12:
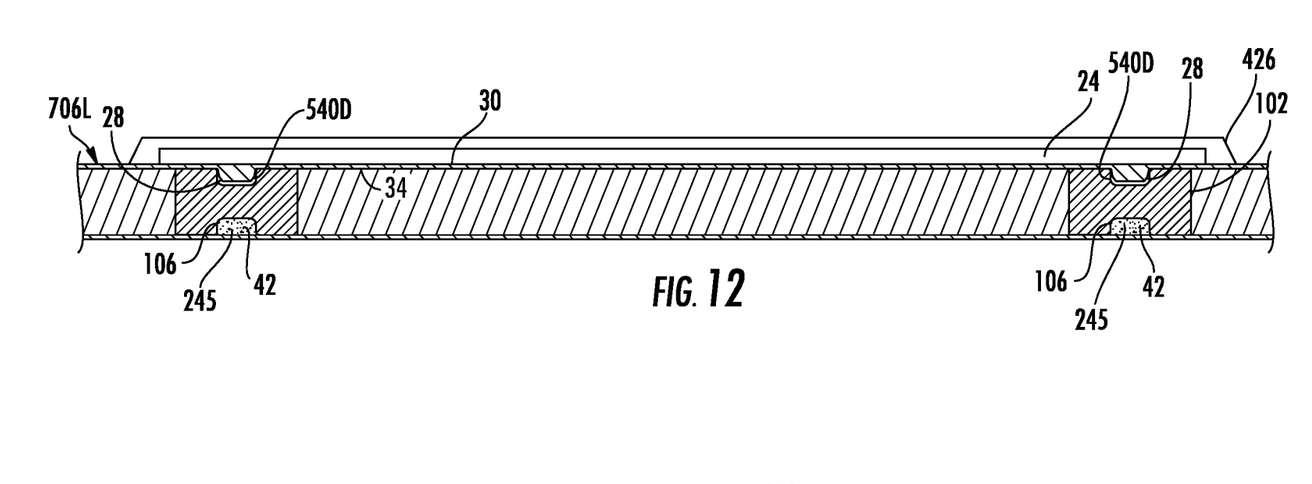
FIG. 12 is a sectional view of a portion of the draper belt of FIG. 11 as it is winding about an example roller.
Figure 13:
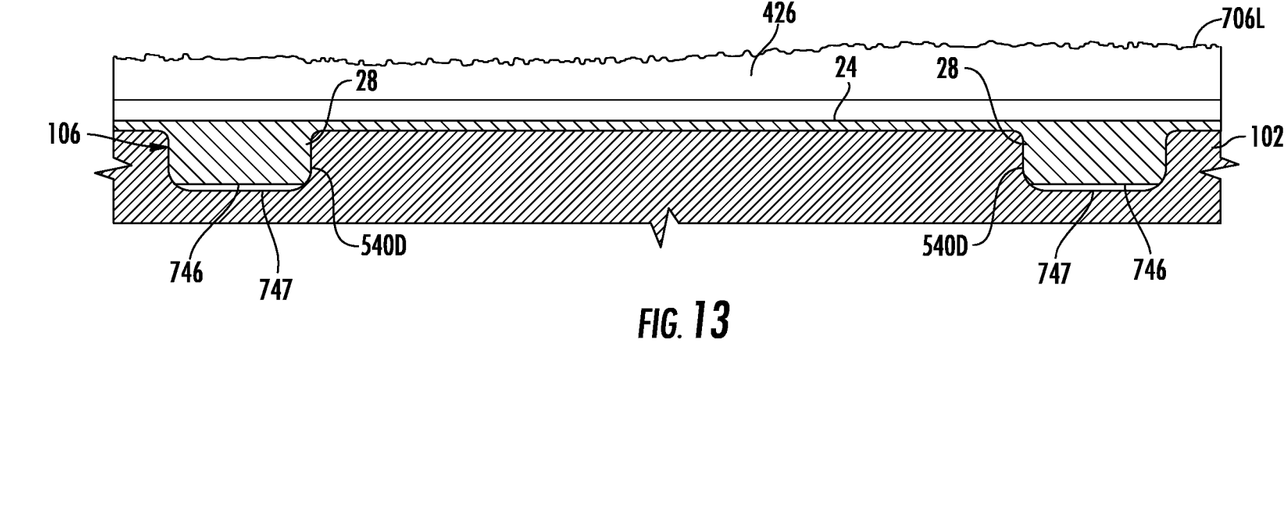
FIG. 13 is an enlarged sectional view of an upper portion of the draper belt of FIG. 12.

FIGS. 11-13 illustrate draper belt 706R in more detail. Draper belt 706R is similar to draper belt 520 described above. Although not specifically illustrated, it should be appreciated that belt 706R wraps about another roller at an opposite end, wherein the other roller also includes grooves 106 that receive belt guides 28. Those components of draper belt 706R and roller 102 which correspond to belts 20 and 520 and roller 102 of FIG. 1 are numbered similarly.

FIG. 12 illustrates draper belt 706R wrapping about roller 102 (or the other roller). FIG. 13 is an enlarged view of an upper portion of draper belt 706R of FIG. 12, illustrating teeth 540D (described above in more detail with respect to draper belt 520) extending within grooves 106. As shown by FIGS. 12 and 13, teeth 540D have lower surfaces 746 that are spaced from the floor 747 of each of grooves 106. In the example illustrated, teeth 540D are shaped such that they transversely expand when wrapping about roller 102 to abut the internal side walls of groove 106. Other teeth of draper belt 706L, such as any of the teeth 540 described above with respect to FIG. 8, may interact with grooves 106 in different manners.

As shown by FIG. 13, gaps 42 located between consecutive teeth 540 receive the contaminants 245 being withdrawn from grooves 106. Movement of belt 706L moves the gap 42 and teeth 540 to push or sweep contaminants 245 out of grooves 106. As a result, fewer contaminants remain within grooves 106, reducing the likelihood that entrapped contaminants may undesirably dislodge belt guides 28 from grooves 106.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
   a draper belt for a head of a harvester, the draper belt to extend about a roller having an outer groove encircling the roller, the draper belt comprising:
   a web having a first surface to carry crop material and a second surface to face the roller; and
   an elastomeric belt guide comprising:
   an elongate protuberance projecting from the second face for being received within the outer groove; and
   teeth supported by and projecting from the elongate protuberance.

2. The apparatus of claim 1, wherein the teeth have a height of at least 1 mm in a non-deformed state.

3. The apparatus of claim 1, wherein the teeth have a height of at least 3 mm in a nondeformed state.

4. The apparatus of claim 3, wherein consecutive teeth are separated by a gap having a width of at least 3 mm in a nondeformed state.

5. The apparatus of claim 1, wherein the teeth comprise differently sized teeth.

6. The apparatus of claim 1, wherein the elongate protuberance and the teeth continuously extend along an entirety of the web.

7. The apparatus of claim 1, wherein the teeth are arranged in groups of teeth, the groups being intermittently located along the web.

8. The apparatus of claim 7, wherein the draper belt comprises cleats extending from the first surface, wherein the groups of teeth are aligned with the cleats.

9. The apparatus of claim 1, wherein the teeth have tips spaced from the second surface by a distance less than a depth of a corresponding groove in the roller that is to receive the elastomeric belt guide.

10. The apparatus of claim 1, wherein the teeth comprise a first tooth having a first shape and a second tooth to having a second shape different than the first shape.

11. The apparatus of claim 1, wherein the teeth comprise a first tooth extending along a first axis transversely across the elastomeric belt guide and a second tooth extending along a second axis transversely across the elastomeric belt guide, the second axis extending nonparallel to the first axis.

12. The apparatus of claim 1, wherein the elastomeric belt guide extends along a first axis and wherein teeth comprise a first tooth extending along a second axis oblique to the first axis and a second tooth extending along a third axis oblique to the first axis.

13. The apparatus of claim 1 further comprising the roller having the outer groove receiving the elastomeric belt guide.

14. The apparatus of claim 1, wherein the teeth have rounded tips.

15. The apparatus of claim 1, wherein adjacent teeth are spaced by a mouth having a first width while the teeth are not extending about the roller and a second width while the teeth are extending about the roller, wherein the second width is no greater than 50% of the first width.

16. A harvester head comprising:
   a first roller having first outer groove;
   a second roller having a second outer groove;
   a draper belt extending about the first roller and the second roller, the draper belt comprising:
   a web having a first surface to carry crop material and a second surface to face the roller;
   an elastomeric belt guide projecting from the second surface, the belt guide comprising downwardly projecting teeth, wherein the teeth comprise differently sized teeth.

17. The apparatus of claim 16, wherein the teeth have a height of at least 3 mm and a width of at least 3 mm in a nondeformed state.

18. The apparatus of claim 16, wherein the teeth extend at different angles across the belt guide.

19. The harvester head of claim 16, wherein elastomeric belt guide further comprises an elongate protuberance supporting the teeth and projecting from the second surface into the first outer groove, the teeth projecting from the elongate protuberance.

20. An apparatus comprising:
   a draper belt for a head of a harvester, the draper belt to extend about a roller having an outer groove encircling the roller, the draper belt comprising:
   a web having a first surface to carry crop material and a second surface to face the roller; and
   an elastomeric belt guide projecting from the second surface, the belt guide comprising downwardly projecting teeth, wherein the teeth extend at different angles across the belt guide.

* * * * *